(12) United States Patent
Sharma et al.

(10) Patent No.: US 7,877,081 B2
(45) Date of Patent: Jan. 25, 2011

(54) PROXY-ENCRYPTED AUTHENTICATION FOR TETHERED DEVICES

(75) Inventors: Shshank Sharma, San Diego, CA (US); Jeffrey Alan Dyck, San Diego, CA (US); Marcello Lloy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 685 days.

(21) Appl. No.: 11/772,820

(22) Filed: Jul. 2, 2007

(65) Prior Publication Data

US 2008/0003981 A1 Jan. 3, 2008

Related U.S. Application Data

(63) Continuation-in-part of application No. 10/627,171, filed on Jul. 25, 2003, now Pat. No. 7,239,865.

(51) Int. Cl.
H04M 1/68 (2006.01)
(52) U.S. Cl. ............ 455/411; 455/410; 713/168
(58) Field of Classification Search ......... 455/410–411; 713/168–171
See application file for complete search history.

(56) References Cited

U.S. PATENT DOCUMENTS

| | | | |
|---|---|---|---|
| 5,668,876 A * | 9/1997 | Falk et al. | 380/271 |
| 6,370,118 B1 | 4/2002 | Lioy et al. | |
| 6,512,754 B2 * | 1/2003 | Feder et al. | 370/338 |
| 6,745,047 B1 * | 6/2004 | Karstens et al. | 455/556.1 |
| 6,785,823 B1 * | 8/2004 | Abrol et al. | 726/7 |
| 6,879,574 B2 * | 4/2005 | Naghian et al. | 370/338 |
| 6,954,793 B2 | 10/2005 | Ramaswamy et al. | |
| 7,152,160 B2 | 12/2006 | Lantto et al. | |
| 7,171,460 B2 | 1/2007 | Kalavade et al. | |
| 7,239,865 B2 * | 7/2007 | Dyck et al. | 455/411 |
| 7,342,894 B2 | 3/2008 | Abrol et al. | |
| 2002/0181498 A1 * | 12/2002 | Hsu et al. | 370/466 |
| 2004/0044789 A1 * | 3/2004 | Angel et al. | 709/238 |
| 2004/0219954 A1 * | 11/2004 | Odinak | 455/569.1 |
| 2005/0268107 A1 | 12/2005 | Harris et al. | |

FOREIGN PATENT DOCUMENTS

| | | |
|---|---|---|
| EP | 1191707 | 12/2001 |
| EP | 1160997 | 3/2003 |
| WO | WO2004012362 | 2/2004 |

OTHER PUBLICATIONS

Simpson W. et al: "The Point-to-Point Protocol (PPP); RFC1661.TXT" IEFT Standard, Internet Engeneering Task Force, IEFT, Jul. 1, 1994, XP015007448.
International Search Report and Written Opinion-PCT/US2008/068879, International Search Authority-European Patent Office-Feb. 18, 2009.

* cited by examiner

*Primary Examiner*—Kamran Afshar
(74) *Attorney, Agent, or Firm*—James T. Hagler

(57) ABSTRACT

Methods and apparatus are presented herein for allowing a wireless communication device to perform a proxy authentication on behalf of a tethered device and ensure the authentication is encrypted.

39 Claims, 12 Drawing Sheets

PROXY-ENCRYPTED AUTHENTICATION FOR TETHERED DEVICES

RELATED APPLICATIONS

The present application is a continuation-in-part of U.S. patent application Ser. No. 10/627,171 filed Jul. 25, 2003, which published as U.S. Patent Application No. 2005/0039005 on Feb. 17, 2005 and will issue as U.S. Pat. No. 7,239,865 on Jul. 3, 2007, the entire contents of which are hereby incorporated by reference.

BACKGROUND

1. Field

The present invention relates generally to wireless communication networks and packet switched data networks. More specifically, the present invention relates to using a wireless communication device to perform a proxy authentication on behalf of a tethered device, wherein the tethered device is using the wireless communication network to access a packet switched data network.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well-known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 (cdma2000 1.times.EV-DV) and IS-856 (cdma2000 1.times.EV-DO) and has been approved by the TIA. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214. The W-CDMA standard is in the process of incorporation into a GSM-based system known as Universal Mobile Telecommunications Systems (UMTS).

The telecommunication standards cited above are examples of only some of the various communications systems that can be implemented. One general category of standards is referred to as "Third Generation" or "3G," of which cdma2000 and W-CDMA are both members. These 3G standards are directed towards increased data rates, which will support increased user numbers and data-intensive applications.

Given the growing demand for wireless data applications, the need for very efficient wireless data communication systems has become increasingly significant. One such wireless data application is the transmission of data packets that originate or terminate at packet-switching networks. Various protocols exist for transmitting packetized traffic over packet-switching networks so that information arrives at its intended destination. The primary protocol for transmitting packetized traffic is "The Internet Protocol,", Request for Comment (RFC) 791 (September, 1981). The Internet Protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. Another protocol is the Point-to-Point Protocol (PPP), promulgated in RFC 1661 (July 1994), which is an encapsulation protocol for transporting IP traffic over point-to-point links. Yet another protocol is the IP Mobility Support, promulgated in RFC. 2002 (October 1996), which is a protocol that provides for transparent outing of IP datagrams to mobile nodes.

Hence, the transmission of IP packets from the IP network over a wireless communication network or from the wireless communication network over the IP network can be accomplished by adherence to a set of protocols, referred to as a protocol stack. A wireless communication device may be the origination or the destination of the IP packet, or alternatively, the wireless communication device may be a transparent link to an electronic device. In either case, payload information is broken into packets wherein header information is added to each packet. The IP header sits on top of the PPP layer, which sits on the RLP layer, which sits on top of the physical layer of the wireless air interface. The RLP layer is the Radio Link Protocol layer, which is responsible for selectively retransmitting packets when a transmission error occurs. In a WCDMA system, the PPP layer sits on the Radio Link Control (RLC) layer, which has a similar functionality as the RLP layer.

Data may be transported over-the-air to a packet data service node (PDSN) via an Access Point (AP), whereupon the data is subsequently sent over an IP network. Using terminology from cellular communication system, an AP may also be thought of as a base station or a base station equivalent. Alternatively, IP packets may be transmitted over an IP network to a PDSN, from a PDSN to an AP, and then over-the-air to a wireless communication device. A wireless communication device may be referred to as an Access Terminal (AT) in the terminology of a wireless communication protocol or alternatively, the wireless communication device may be referred to as a Mobile Node (MN) in the terminology of an IP protocol.

There are numerous difficulties that abound when attempting to wirelessly transfer data that originates or terminates in wired environments. One such difficulty is the authentication of the devices that attempt to access packet data services via wireless communications equipment. Due to the multiplicity of protocols involved in transmitting IP packets over a wireless environment, there are a multiplicity of authentication procedures that must be satisfied if a device tethered to a wireless communication device desires access to a wired network. In one possible scenario, the wireless communication device would be required to satisfy authentication procedures of the wireless network, the tethered device may be required to satisfy authentication procedures of the wired network, and the authentication procedures of one may affect the authentication procedures of the other. Hence, when multiple protocols are used, the implementation of different authentication requirements corresponding to each protocol is possible within an end-to-end communication session. However, to implement different authentication requirements in a timely and computationally efficient fashion is problematic.

SUMMARY

Methods and apparatus are presented herein to address the above stated difficulties. In an embodiment, a method is presented for performing an encrypted proxy authentication of a terminal equipment coupled to a wireless unit, the method including intercepting in the wireless unit a link control protocol message directed to the terminal equipment; determining if an authentication protocol indicated in the link control protocol message is acceptable to the wireless unit; and generating an appropriate response to the link control protocol message without input from the terminal equipment. In another embodiment, the generated response may indicate an acceptable authentication protocol. In another aspect, if a predetermined number of retries has expired, the generated response may reject authentication as a configuration option. In another embodiment, if the link control protocol message indicates an acceptable authentication protocol, the link control protocol message is forwarded to the terminal equipment. In another embodiment, if the link control protocol message includes an authentication challenge, the acceptable response is a response to the challenge, and the challenge is forwarded to the terminal equipment, while a challenge response received from the tethered device is ignored.

In another embodiment, an apparatus within a wireless unit is presented for performing a proxy authentication of a terminal equipment coupled to the wireless unit, the apparatus comprising: at least one memory element; and at least one processing element configured to execute a set of instructions stored upon the at least one memory element, the set of instructions for: intercepting in the wireless unit a link control protocol message directed to the terminal equipment; determining if an authentication protocol indicated in the link control protocol message is acceptable to the wireless unit; and generating an appropriate response to the link control protocol message without input from the terminal equipment.

In another embodiment, an apparatus is presented for performing a proxy authentication of a device tethered to a wireless unit, the apparatus including means for intercepting in the wireless unit a link control protocol message directed to the terminal equipment; means for determining if an authentication protocol indicated in the link control protocol message is acceptable to the wireless unit; and means for generating an appropriate response to the link control protocol message without input from the terminal equipment.

DETAILED DESCRIPTION

Figure 1:
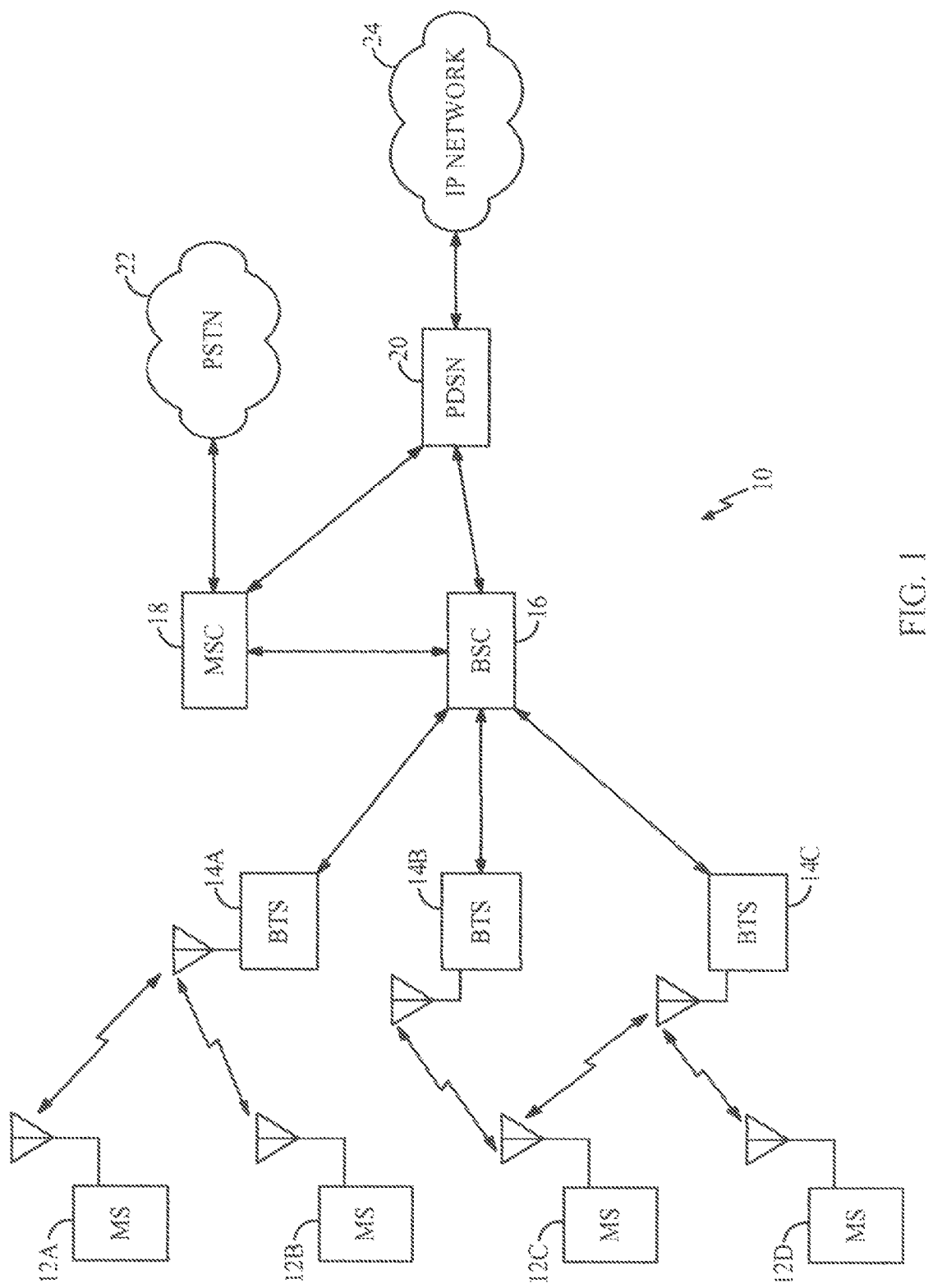
FIG. 1 is a diagram of a wireless communication network.

As illustrated in FIG. 1, a wireless communication network 10 generally includes a plurality of access terminals (also called remote stations, mobile stations, subscriber units, or user equipment) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and a packet switched data network 24 (typically an Internet Protocol (IP) network). For purposes of simplicity, four access terminals 12a-12d, three base stations 14a-14c, one BSC 16, one MSC 18, and one PDSN 20 are shown. It would be understood by those skilled in the art that there could be any number of access terminals 12, base stations 14, BSCs 16, MSCs 18, and PDSNs 20.

In one embodiment the wireless communication network 10 is a packet data services network. The access terminals 12a-12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed: location communication module such as might be found in a wireless local loop or meter reading system. In the most general embodiment, access terminals may be any type of communication unit.

The access terminals 12a-12d may advantageously be configured to perform one or more wireless packet data protocols such as described in, for example, the EIA/TIA/IS-707 standard. In a particular embodiment, the access terminals 12a-12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a-14c receive and demodulate sets of reverse link signals from various access terminals 12a-12d engaged in telephone calls, Web browsing, or other data communications. Each reverse link signal received by a given base station 14a-14c is processed within that base station 14a-14c. Each base station 14a-14c may communicate with a plurality of access terminals 12a-12d by modulating and transmitting sets of forward link signals to the access terminals 12a-12d. For example, as shown in FIG. 1, the base station 14a communicates with first and second access terminals 12a, 12b simultaneously, and the base station 14c communicates with third and fourth access terminals 12c, 12d simultaneously. The resulting packets are forwarded to the BSC 16, which provides call resource allocation and mobility management functionality including the orchestration of soft handoffs of a call for a particular access terminal 12a-12d from one base station 14a-14c to another base station 14a-14c. For example, an access terminal 12c is communicating with two base stations 14b, 14c simultaneously. Eventually, when the access terminal 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a WCDMA system, the terminology of the wireless communication system components differs, but the functionality is the same. For example, a base station can also be referred to as a Radio Network Controller (RNC) operating in a UMIS Terrestrial Radio Access Network (U-TRAN).

In the various existing communication systems, different nomenclature exists for the various formats in which voice and data traffic can be transmitted, such as, e.g. frames, packets, and subpackets. The scope of the embodiments described herein extends to all wireless communication systems using any of the various transmission formats. However, for the purpose of illustrative ease, the term "packets" will be used herein to describe both the transmission channel format in which traffic is carried and the structure of the traffic.

It should be noted that the "packets" of the CDMA system are structurally distinct from the IP "packets" of the packet switched data network. Both are units describing the format in which data is transmitted, but one is optimized for wireless networks and the other is optimized for a packet switched data network. For example, a data packet from an IP source would contain a header portion and a data portion. However, a data packet for transmission over-the-air carries data that has been encoded and modulated, and probably subjected to symbol repetition before being packed into a packet. Hence, a packet from a packet switched data network will have to be reformatted for use on the wireless network. In the embodiments described herein and in the art, the meaning of the word "packet" is to be inferred by the usage of the word.

Since the subject matter of the embodiments is directed towards mobile IP telephony, the terminology of RFC 2002 (October 1996) will also be used forthwith. The protocol promulgated in this document enables a mobile wireless communication device to change the point of attachment to the Internet without having to change the IP address of the device. Namely, RFC 2002 describes a registration scheme that informs a home agent of the location of a mobile communication device so that the home agent can route data packets through foreign agents. A "home agent" is the infrastructure element that processes IP packets at the home system of the access terminal. A "foreign agent" is the infrastructure element that services the access terminal at a visited system. The access terminal is also referred to as a "Mobile Node" (MN).

In reference to FIG. 1, the functions of a foreign agent and/or home agent can be accomplished by a PDSN 20 in a visited network or a PDSN 20 in the home network. Authentication, authorization, and accounting functions are usually performed by a server, which is referred to as an Accounting, Authorization, and Accounting (AAA) Server. The AAA server is communicatively coupled to either a PDSN and/or a BSC.

In cdma2000 1×EV-DO, hereinafter referred to as EV-DO, the wireless communication system entities of FIG. 1 are conceptually simplified to an access terminal and an access network. An access terminal (AT) is any device that allows a user to access a packet switched data network through the EV-DO wireless access network. The access network (AN) comprises any network equipment/entity that provides data connectivity between a packet switched data network and access terminals.

Figure 2:
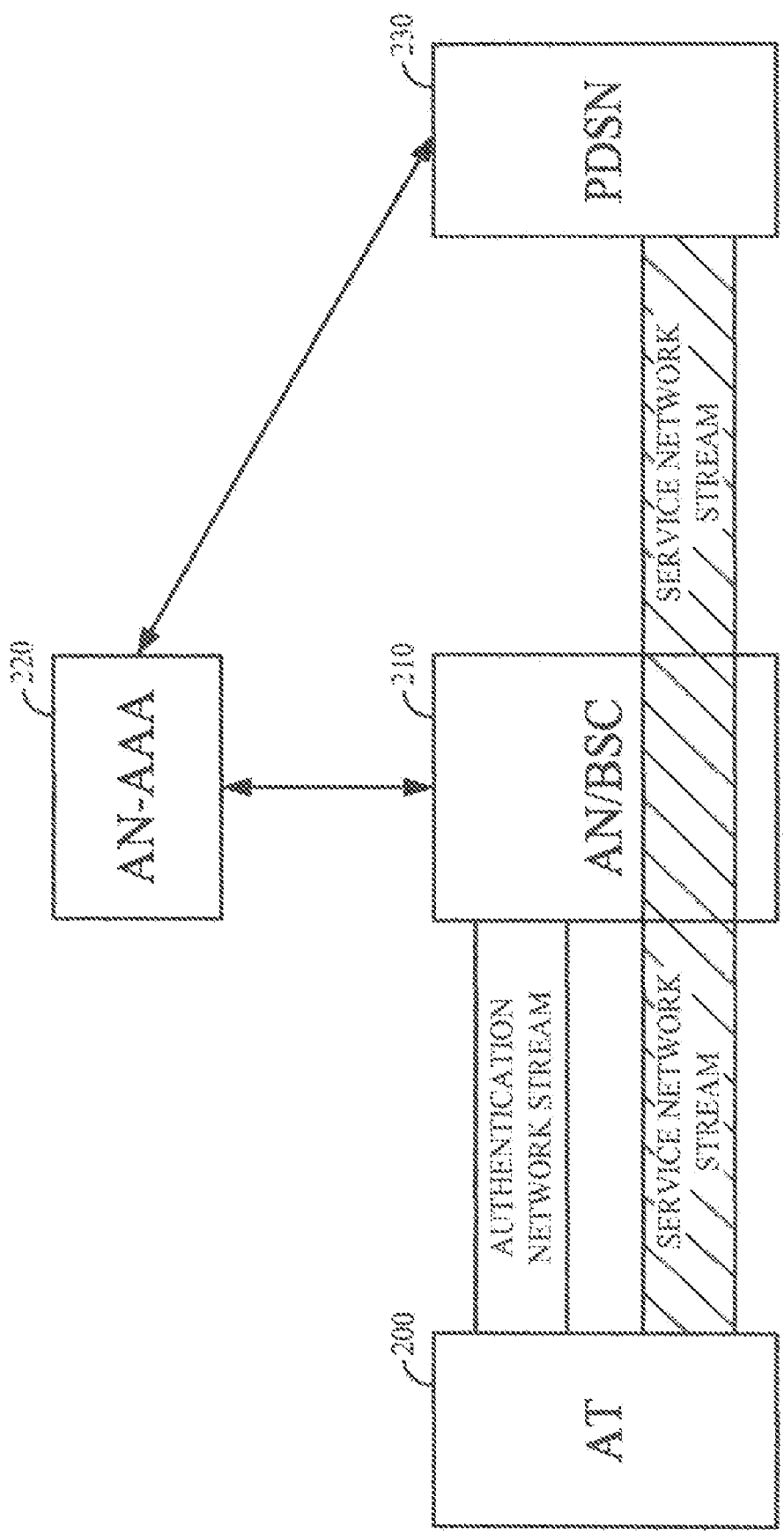
FIG. 2 is a diagram of the data connectivity between an Access Terminal (AT), an Access Network (AN), an AN-Authentication, Authorization, and Accounting (AN-AAA) server, and a PDSN.

FIG. 2 is a diagram of the data connectivity between an AT 200, an AN 210, an AN-AAA server 220, and a PDSN 230. A communication session is established between the AT 200 and the AN 210 when the AT 200 desires access to the PDSN 230. The session is implemented according to PPP protocols and is referred to as the authentication network stream. The AN 210 communicates with the AN-AAA server 220 in order to determine whether to allow the AT 200 access to the PDSN 230. Based upon the authentication information conveyed within the authentication network stream, the AN 210 transparently passes a service network stream between the AT 200 and the PDSN 230. The PDSN 230 further communicates with the AN-AAA server 220 in order to determine whether to allow the AT 200 access to a packet switched data network (not shown). Based upon the authentication information conveyed within the service network stream, the PDSN 230 allows IP traffic between the packet switched data network (not shown) and the AT 200.

Hence, in an EV-DO system, an authentication procedure takes place to ensure that the AT is an authorized subscriber of the wireless network and an authentication procedure takes place to ensure that the AT is the owner of the radio session. Typically, the AT stores the authentication information and the account information required for such procedures in a secure manner. One such authentication procedure is the Challenge Handshake Authentication Protocol (CHAP). Other authentication protocols may be used without undue experimentation in the described embodiments, but for illustrative ease, CHAP will be described herein. Examples of other authentication protocols are the Mobile IP authentication protocol and the Password Authentication Protocol (PAP).

In a challenge/response authentication protocol such as the ones listed above, the user is provided an unpredictable number and is challenged with the task to encrypt the unpredictable number and return a predictable result. If the user is authorized, then the user would have the correct mechanism, either in hardware or in software, to encrypt the unpredictable number in a manner that is expected by the challenger. For example, if the user is authorized, the user and the challenger would have a shared secret key that could be used to encrypt the challenge. Unauthorized users would lack the appropriate secret key to encrypt the challenge into a response that is expected by the challenger.

When a device is tethered to an AT in order to use the AT as a modem to send and receive IP traffic, various complications arise regarding the authentication of the device tethered to the AT. The use of the word "tethered" herein is for describing the connectivity between a device to a wireless communication device. It is envisioned that such connectivity may be through either a physical connection, such as a cable attachments or direct contact, or a nonphysical connection, such as radio connections, optical connections, or infrared connections.

For optimal performance, the tethered device would enter into PPP negotiations directly with the network. However, the tethered device may not be able to perform the authentication procedures necessary for PPP negotiations with the network because the required network security information is stored within the AT, not the tethered device. Passing the network security information from the AT to the tethered device is an option that is highly undesirable due to the potential for misuse of said security information.

One solution is to perform the PPP negotiations and authentication procedures between the AT and the AN, and to subsequently perform the PPP negotiations between the AT and the tethered device without performing the authentication procedures. However, this solution is flawed in that two (2) PPP negotiations would be performed, which introduces an unacceptable time delay. Moreover, this solution is flawed in that the tethered device is not informed that authentication has occurred. It should be noted that an end-to-end PPP negotiation process requires certain procedural steps, such as in authentication, to be completed by each end before the PPP session is fully established.

The embodiments that are described herein are for performing a single end-to-end PPP negotiation that enhances the security of the authentication and account information while satisfying the authentication procedures of both the tethered device and the AT.

Figure 3:
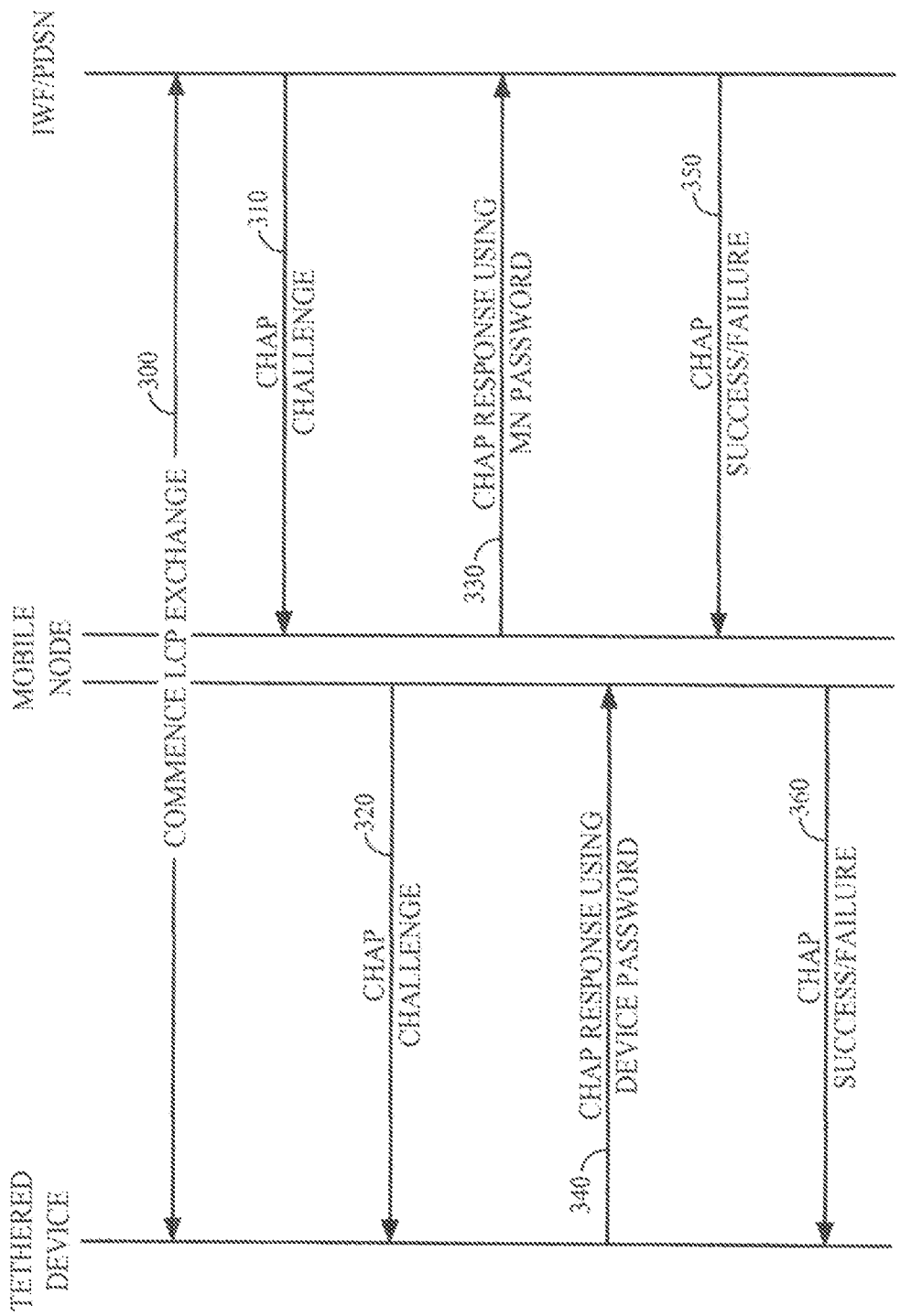
FIG. 3 is an illustration of the program flow for a proxy authentication.

In a first embodiment, hardware within an AT is configured to perform a proxy authentication of the tethered device. Since the AT is being used as a modem for the tethered device, the terminology of the Mobile IP protocol is used in FIG. 3, so that the AT is referred to as a mobile node (MN). FIG. 3 illustrates the high level procedure for the proxy authentication. At instance 300, a tethered device and a PDSN/IWF commence a PPP session using the Link Control Protocol (LCP). LCP is used to establish, configure, maintain and terminate the PPP session. The MN acts as a transparent link between the tethered device and the PDSN/IWF. At instance 310, the PDSN/IWF sends a CHAP challenge to the MN. At instance 320, the MN forwards the CHAP challenge to the tethered device. At instance 330, the MN generates a CHAP response using a password or shared key that is already stored within the MN. Note that the MN generates the CHAP response independently of the tethered device.

At instance 340, the MN receives a CHAP response from the tethered device. Upon receipt of CHAP response from the tethered device, the MN intentionally withholds transmission of the CHAP response from the tethered device to the PDSN/IWF.

At instance 350, the MN receives a CHAP success/failure indicator from the PDSN/IWF. At instance 360, the MN forwards the CHAP success/failure indicator to the tethered device.

Hence, in the manner described above, the first embodiment allows the MN to perform a proxy authentication of a tethered device using CHAP. In other aspects of the embodiment, other challenge/response authentication protocols such as PAP and Mobile IP Authentication may be used. In another embodiment, the MN may interchange the timing of instances 320 and 330, so that the MN may generate a response to the challenge before forwarding the challenge to the tethered device.

In general, the MN acts to intercept a challenge directed to the tethered device, generates an appropriate response to the challenge without waiting for input from the tethered device, forwards the challenge to the tethered device, and ignores the challenge response generated by the tethered device.

If the response generated by the MN is lost, which may occur due to the error-prone nature of the wireless environment, then subsequent challenges retransmitted from the network will ensure that the authentication procedure is completed.

In order to ensure that encrypted authentication is employed, the MN may also generate a response to the LCP Configuration-Request message (C-REQ) that precedes the PPP authentication phase without waiting for input from the tethered device. The use of encrypted authentication is preferred for wireless networks, but may not be a requirement of the terminal equipment, such as a tethered device. (Since the embodiments are equally applicable to situations where the terminal equipment is not "tethered" to the wireless modem, such as in a dual-processor device, the more general term of "terminal equipment" will be used herein.) Since in the pseudo-netmodel mode of operation the wireless modem is not the PPP endpoint, the wireless modem may not control the LCP configuration exchange. Authentication and account information may reside in the wireless modem, rather than in the terminal equipment, in order to provide enhanced network security and/or simplify the device and software architectures. However, if a non-encrypted authentication protocol (e.g., PAP) is used to establish a wireless network communication link, the authentication credentials will be transmitted over the air in clear text which makes them vulnerable to interception by eavesdropping equipment. Thus, the use of a non-encrypted authentication protocol increases the risk of network access by unauthorized users who obtain authentication credentials by using eavesdropping techniques. To reduce this risk, the MN can be configured to enforce encrypted authentication protocols by directly generating a response to an LCP configuration request message that proposes the use of authentication but not encrypted authentication.

One of the configuration options defined for the PPP LCP protocol is Authentication-Protocol. Values contained within the LCP configuration request (C-REQ) message may be used to indicate the type of authentication protocol, if any, that is proposed. Thus, by comparing the value to an initialization table, a receiving processor can determine the type of authentication protocol that is being proposed.

Figure 4:
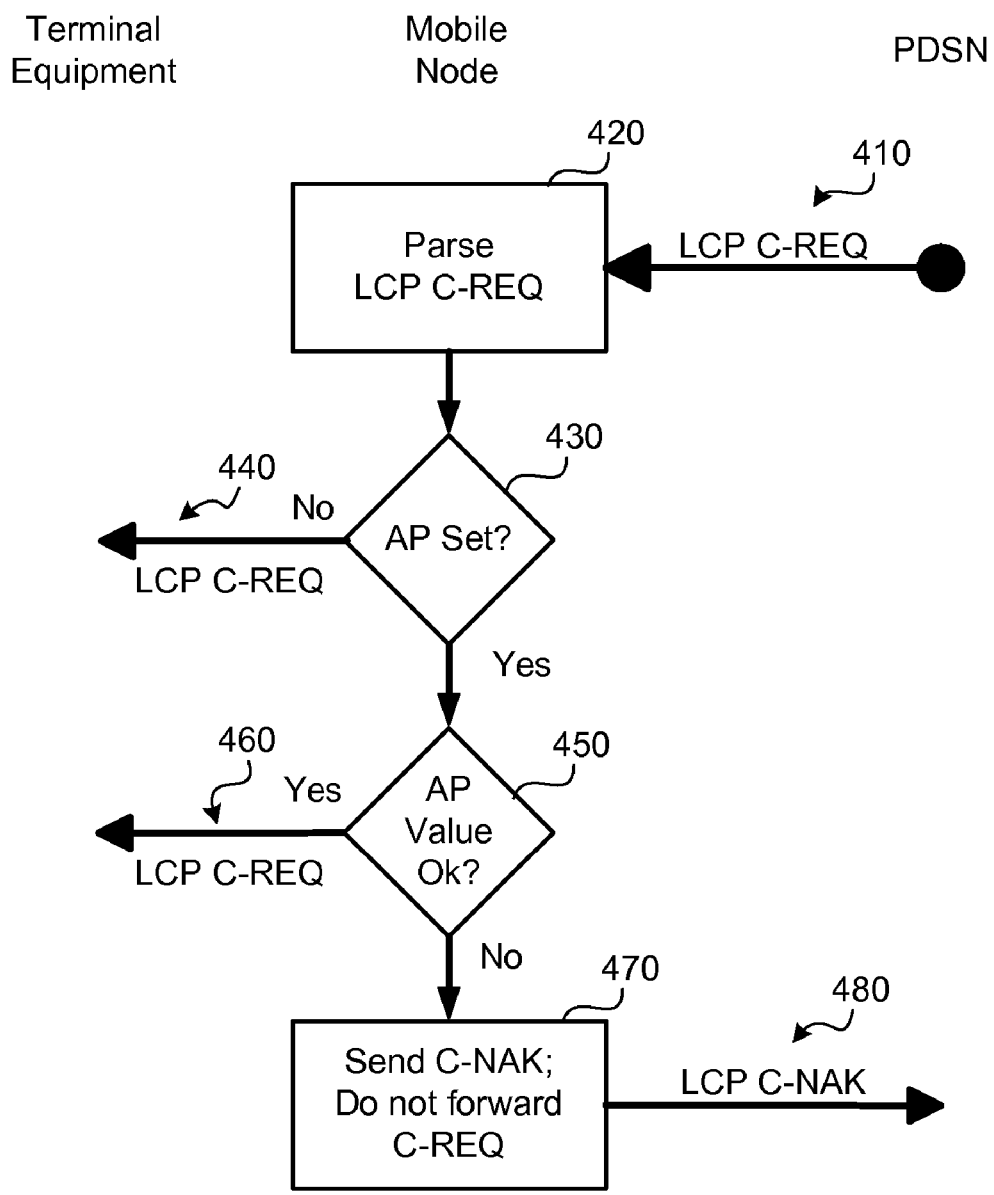
FIG. 4 is a process flow diagram for a portion of a method of enforcing an encrypted proxy authentication.

Generation of an appropriate response by the MN to a configuration request directed to the tethered device depends upon whether authentication is indicated in the LCP authentication request. FIG. 4 illustrates a general process by which the MN can respond to LCP configuration request (C-REQ) messages depending upon the authentication protocol indicated in the value field of the LCP Authentication-Protocol (AP) option. In order to determine the appropriate response to an LCP configuration request message 410 from an PDSN/IWF device, the MN parses the request to read the authentication protocol (AP) value, step 420. If the AP value in the LCP configuration message is set to no authentication, step 430, then the configuration request is passed to the terminal device, step 440, with the MN acting as a transparent link between the tethered device and the PDSN/IWF. However, if the AP value in the LCP configuration request message indicates that authentication is proposed by the PDSN/IWF, then the MN tests whether the AP value corresponds to an acceptable authentication protocol, step 450. If the AP value is acceptable, then the configuration request message is forwarded on to the terminal equipment, step 460. However, if the AP value is unacceptable, then the MN generates an appropriate response to the PDSN/IWF indicating that the AP value is unacceptable, step 470. This message may be in the form of a configuration not acceptable (C-NAK) message which specifies a value that is acceptable, step 480. For example, the C-NAK message could specify that the AP value is unacceptable by proposing an acceptable value, such as CHAP. The process illustrated in FIG. 4 is repeated until either an acceptable AP value is included in the configuration request message, or the number of retries (i.e., loops through the process) exceeds a preset number. The number of retries can be determined by a configurable retry counter that is initialized with the number of C-NAK messages that may be sent before the MN should give up authentication protocol negotiations.

For example, if the LCP configuration request message (C-REQ) 410 includes an AP value indicating that PAP is proposed (i.e., AP=PAP), the MN determines that authentication is requested (step 430) and that the requested type of authentication is unacceptable (step 450). In response, the MN would send a C-NAK message 480 to the PDSN/IWF indicating that PAP (i.e., AP=PAP) is unacceptable and that CHAP (i.e., AP=CHAP) is acceptable (step 470). As another example, if the LCP C-REQ message 410 includes an AP value proposing that no authentication be employed (e.g., AP=0), the MN directly forwards the LCP C-REQ message 440 to the terminal equipment because communicating without authentication does not expose authentication credentials to eavesdropping. Similarly, if the LCP C-REQ message proposes CHAP (i.e., AP=CHAP), which does not transmit authentication credentials in the clear, the MN directly forwards the LCP C-REQ message 440 to the terminal equipment because this authentication protocol also does not expose authentication credentials to eavesdropping.

In testing the AP value, the wireless modem can compare the value to a prioritized list of acceptable, desirable and/or unacceptable authentication protocols. The example embodiments described herein cite CHAP as an acceptable authentication protocol value and PAP as an unacceptable authentication protocol value. This is because PAP is non-encrypted, which raises the risk of authentication credentials being obtained by unauthorized parties. In contrast, CHAP is an encrypted authentication protocol presently secure from eavesdropping. The security of encrypted authentication protocols like CHAP depends in part upon the commercial unavailability of the computing power sufficient to determine the encryption key and algorithm used to generate the challenge response hash. However, it is expected that in the future commercially-available computing power will increase such that present CHAP hash algorithms may become vulnerable.

For this reason, it is expected that additional encrypted authentication protocols will be developed over time to increase security (e.g., by increasing the size of keys and complexity of hashing algorithms). It is also expected that some current encrypted authentication protocols may become increasingly vulnerable to interception and compromise. Thus, it is anticipated that encrypted authentication protocols will be developed with varying degrees of vulnerability, and therefore varying levels of desirability. To accommodate this, the MN may compare the AP value in the configuration request to a prioritized list of authentication protocols, and generate an appropriate response based on the prioritized list. For example, the MN may send a C-NAK response that counter proposes the highest priority protocol in a prioritize list of protocols known or accessible to the MN. If a prioritized list of protocols is employed, the process of the MN responding directly to the PDSN/IWF will continue until the proposed authentication value received from the PDSN/IWF is acceptable to the MN. Therefore, the use of CHAP and PAP in the illustrative embodiments should not be construed as limiting the potential responses of the MN to a configuration request specifying authentication.

Figure 5:
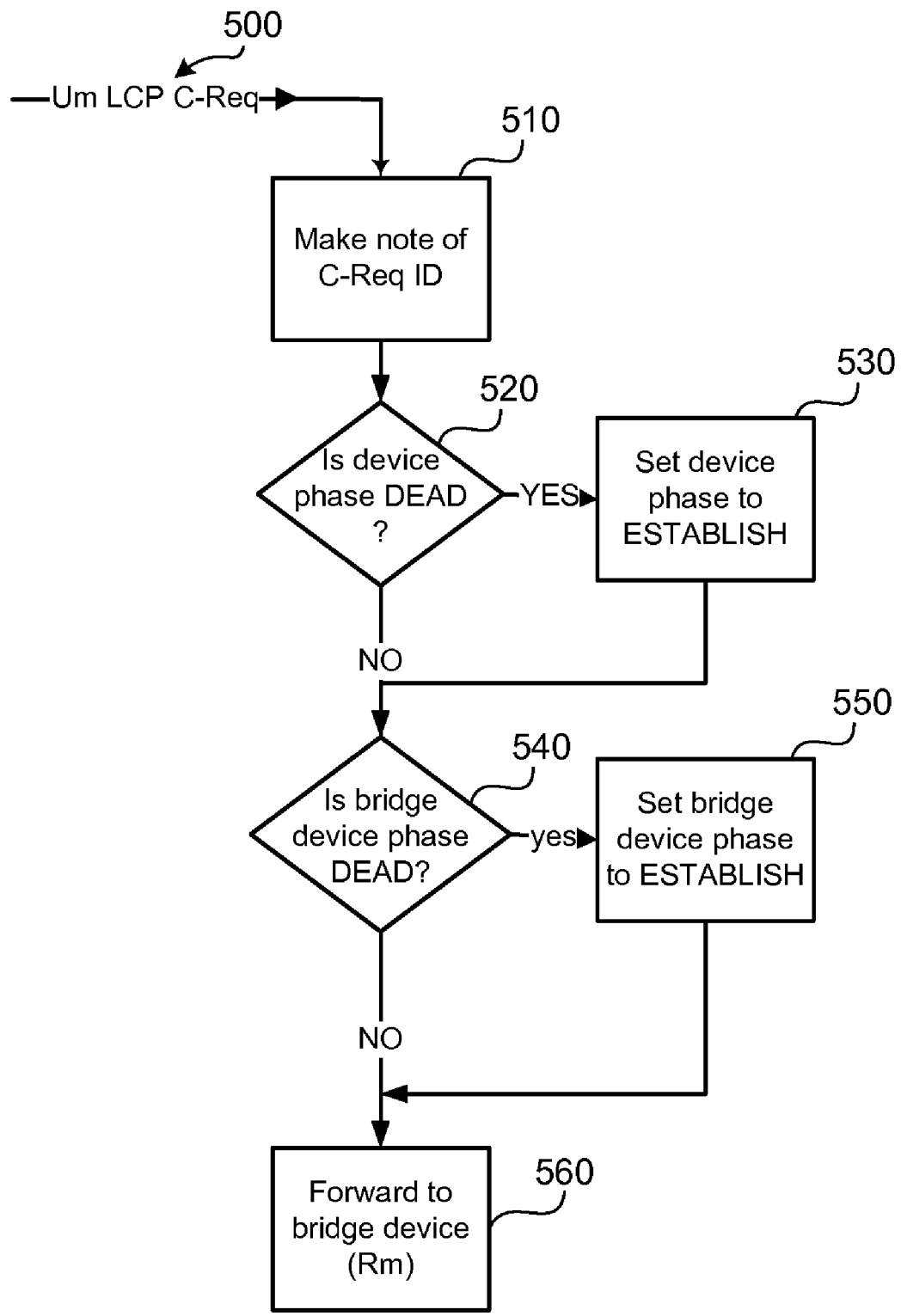
FIG. 5 is a process flow diagram for a portion of the processing of a mobile node that does not enforce encrypted proxy authentication.

Previously known operations of the MN during the LCP configuration exchange are described in U.S. Pat. No. 6,370,118, which is assigned to the assignee of the present invention and incorporated by reference herein. As part of the LCP process, the MN parses the configuration request to obtain the configuration options. As illustrated in FIG. 5, when the MN receives a LCP C-REQ message 500, it saves the proposed configuration options if they are acceptable to the MN (i.e., the proposed configuration is supported by the wireless modem), step 5 10. Additionally, the MN determines if the devise phase is active, step 520, setting the device phase to ESTABLISH if not, step 530, and determines if the bridge device phase is active, step 540, setting the bridge device phase to ESTABLISH if not, step 550. This enables communication with the terminal equipment, after which the configuration request message is forwarded to the terminal equipment, step 560. This process passes the configuration request message through to the terminal equipment which generates the appropriate response.

Figure 6:
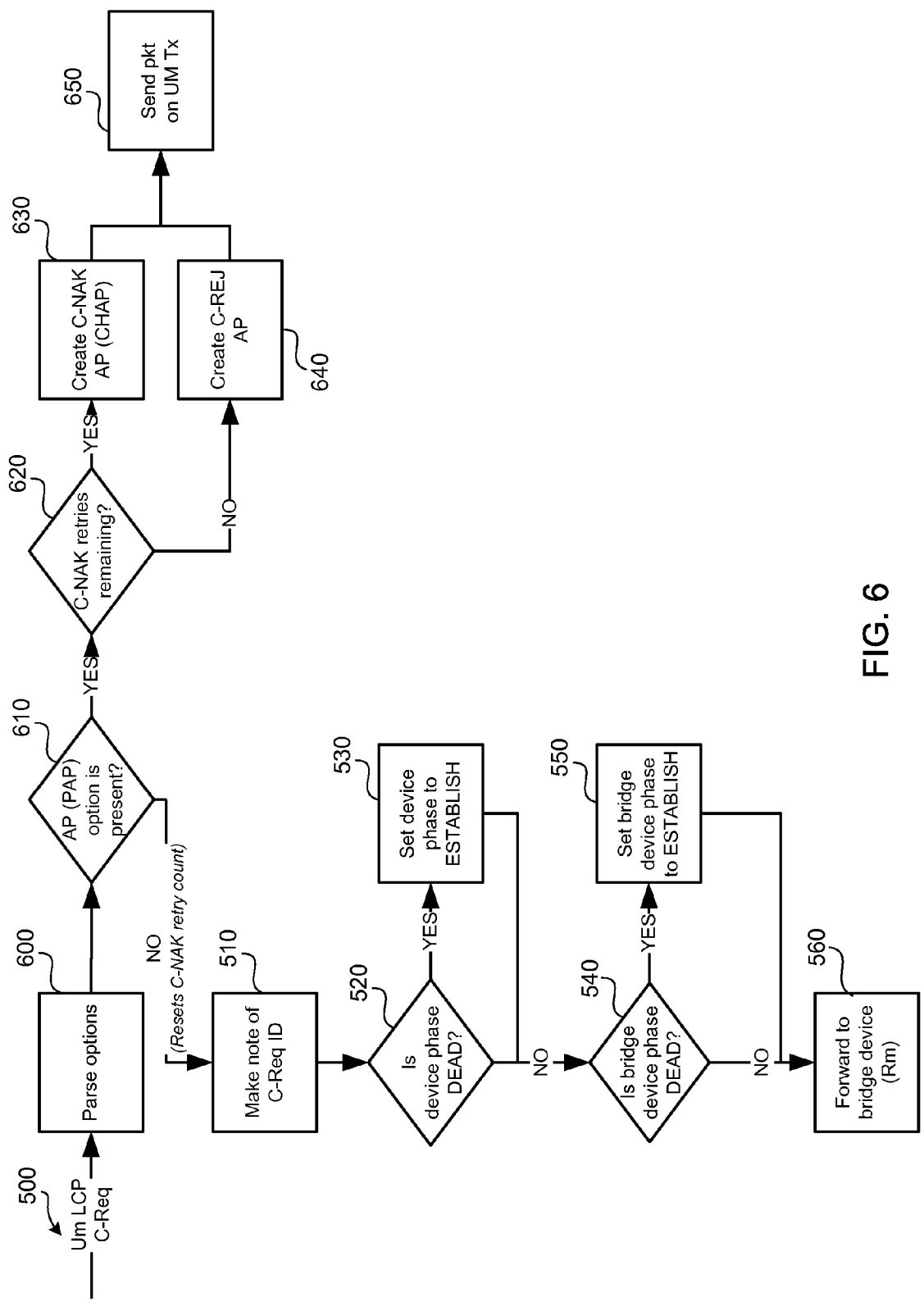
FIG. 6 is a process flow diagram for a portion of the processing of a mobile node of an embodiment that enforces encrypted proxy authentication.

FIG. 6 illustrates an embodiment which modifies the operation of the MN during the LCP process to implement the general method illustrated FIG. 4. In this embodiment, the incoming configuration request message, 500, is parsed by the MN to obtain the proposed configuration options, including the AP value, step 600. If the AP value indicates that an acceptable authentication protocol is proposed (e.g., AP≠PAP), step 610, then the MN process described above with reference to FIG. 5 is implemented. However, if the AP value indicates that an unacceptable authentication protocol is proposed (e.g., AP=PAP), step 610, then the MN queries a counter to determine if a predetermined number of retries has been exceeded, step 620. If the number of retries has not been exceeded, the MN creates a C-NAK response message that indicates an AP value acceptable to the MN (e.g., AP=CHAP), step 630, which is sent to the PDSN/IWF over the Um link, step 650, and decrements the retry counter. If the number of retries has been exceeded, this indicates that the PDSN/IWF is unable to propose an acceptable authentication protocol. In this case, the MN creates a configuration rejection (C-REJ) response message indicating that authentication is an unacceptable configuration parameter, step 640, which is sent to the PDSN/IWF over the a wireless link, step 650. (In common parlance, the data link between the wireless modem and terminal equipment is referred to as the Rm link or Rm side, while the wireless link between the wireless modem and the PDSN/IWF is referred to as the Um link or the Um side.) In each case where the proposed configuration was unacceptable to the MN, there is no need for the MN to forward the configuration request message to the terminal equipment.

Figure 7:
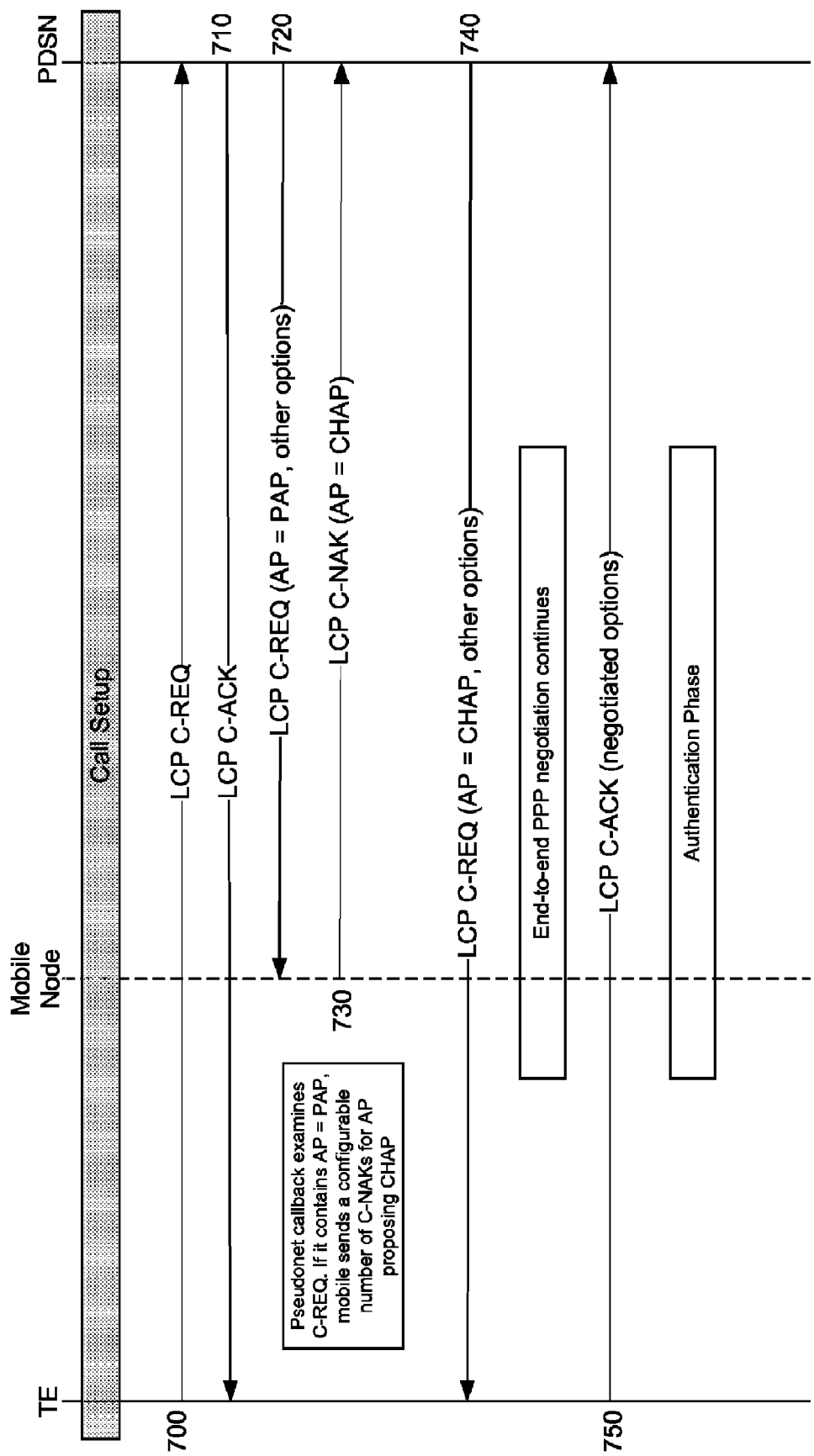
FIG. 7 is an illustration of the program flow for a successful proxy encrypted authentication negotiation according to the embodiment illustrated in FIG. 6.

FIG. 7 illustrates an exchange of messages in an example LCP configuration exchange leading to agreement on an acceptable authentication protocol. Initiation of the LCP process may begin with an LCP configuration request message (C-REQ) 700 sent by the terminal equipment proposing configurations acceptable to the terminal equipment, which is passed through the MN to the PDSN/IWF without modification. In response, the PDSN/IWF will send an acknowledgement message 710, if the proposed configurations are acceptable. The PDSN/IWF then sends a configuration request message (C-REQ) 720 proposing an authentication protocol and other configuration option values. If the proposed application protocol is unacceptable, such as AP=PAP, the mobile node directly responds to the PDSN/IWF with a C-NAK message 730 counter-proposing an acceptable authentication protocol, such as AP=CHAP. In the event that the authentication protocol proposed by the MN in the C-NAK message 730 is acceptable to the PDSN/IWF, the PDSN/IWF sends a new configuration request message (C-REQ) 740 proposing an authentication protocol equal to the acceptable value (e.g., CHAP) along with the other configuration option values. Since the proposed authentication protocol is acceptable to the MN, the configuration request message is passed through to the terminal equipment which responds with an acknowledgement C-Ack message 750 indicating that the configuration has been accepted, thereby completing negotiations of the configuration. The PPP negotiations between the terminal equipment the PDSN/IWF may continue for a while until both sides agree on a negotiated configuration. Once the configuration has been successfully negotiated, the authentication challenge process described above with reference to FIG. 3 proceeds.

Figure 8:
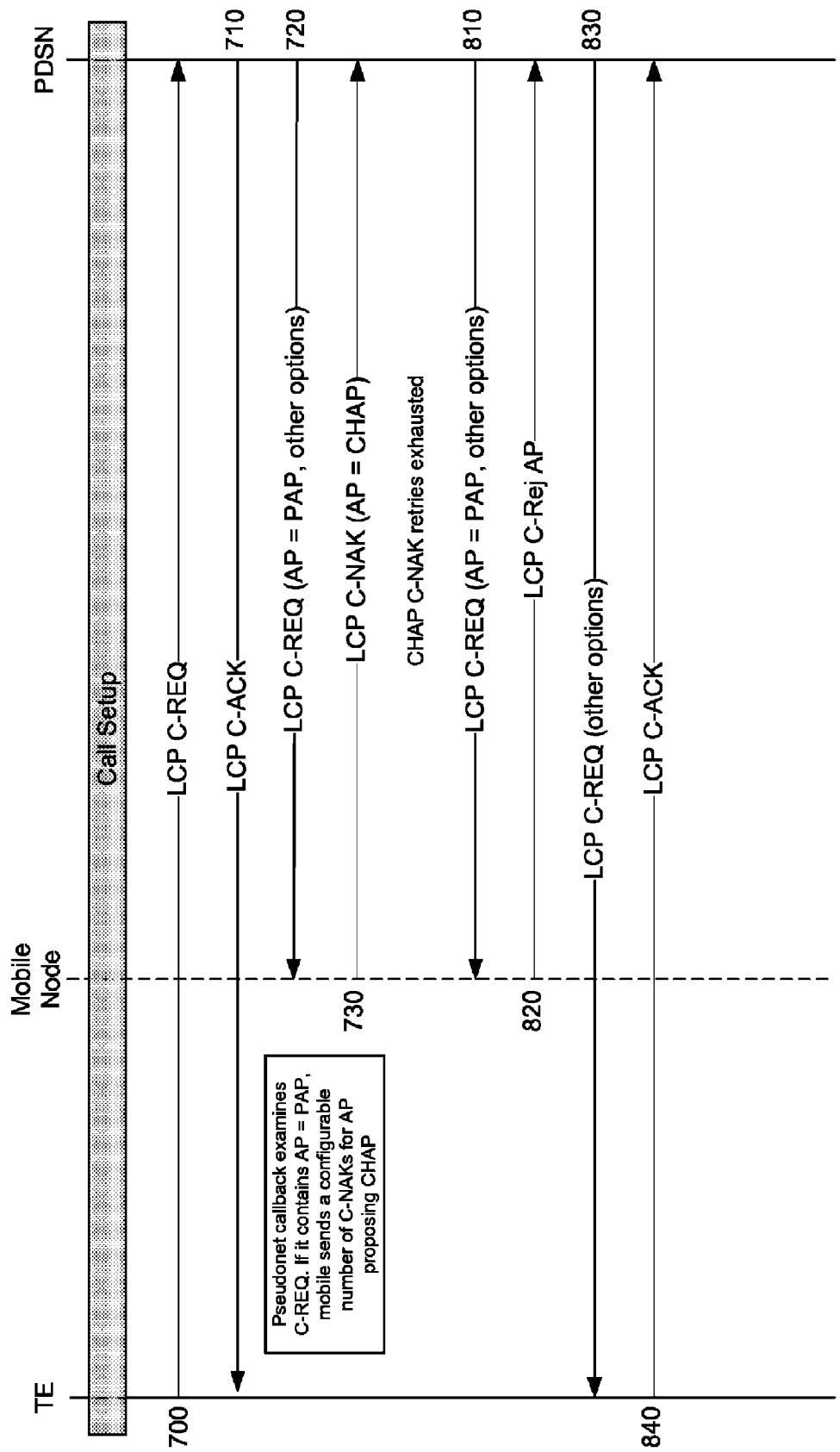
FIG. 8 is an illustration of the program flow for an unsuccessful proxy encrypted authentication negotiation according to the embodiment illustrated in FIG. 6.

FIG. 8 illustrates an exchange of messages in an example LCP configuration exchange leading to a communication configuration in which no authentication protocol is employed. In this example, the messages described above with reference to FIG. 7 are exchanged until the preset number of retries has been exhausted (i.e., no C-NAK retries remain, step 620 in FIG. 6). When the next configuration request (C-REQ) message 810 is received from the PDSN/IWF proposing an unacceptable authentication protocol, the MN responds directly to the PDSN/IWF by sending a configuration reject (C-REJ) message 820 indicating that authentication protocol is rejected as a configuration option. In this example, the PDSN/IWF can accept a configuration in which there is no authentication, and accordingly, sends a configuration request message 830 which does not propose authentication and proposes the other configuration option values. Since there is no unacceptable authentication protocol proposed in the configuration request, the MN and passes the configuration request message on to the terminal equipment. If the terminal equipment accepts all of the other configuration values, it responds with a configuration acknowledgement (C-ACK) message 840. Thereafter the LCP process proceeds without the authentication challenge process illustrated in FIG. 3.

Figure 9:
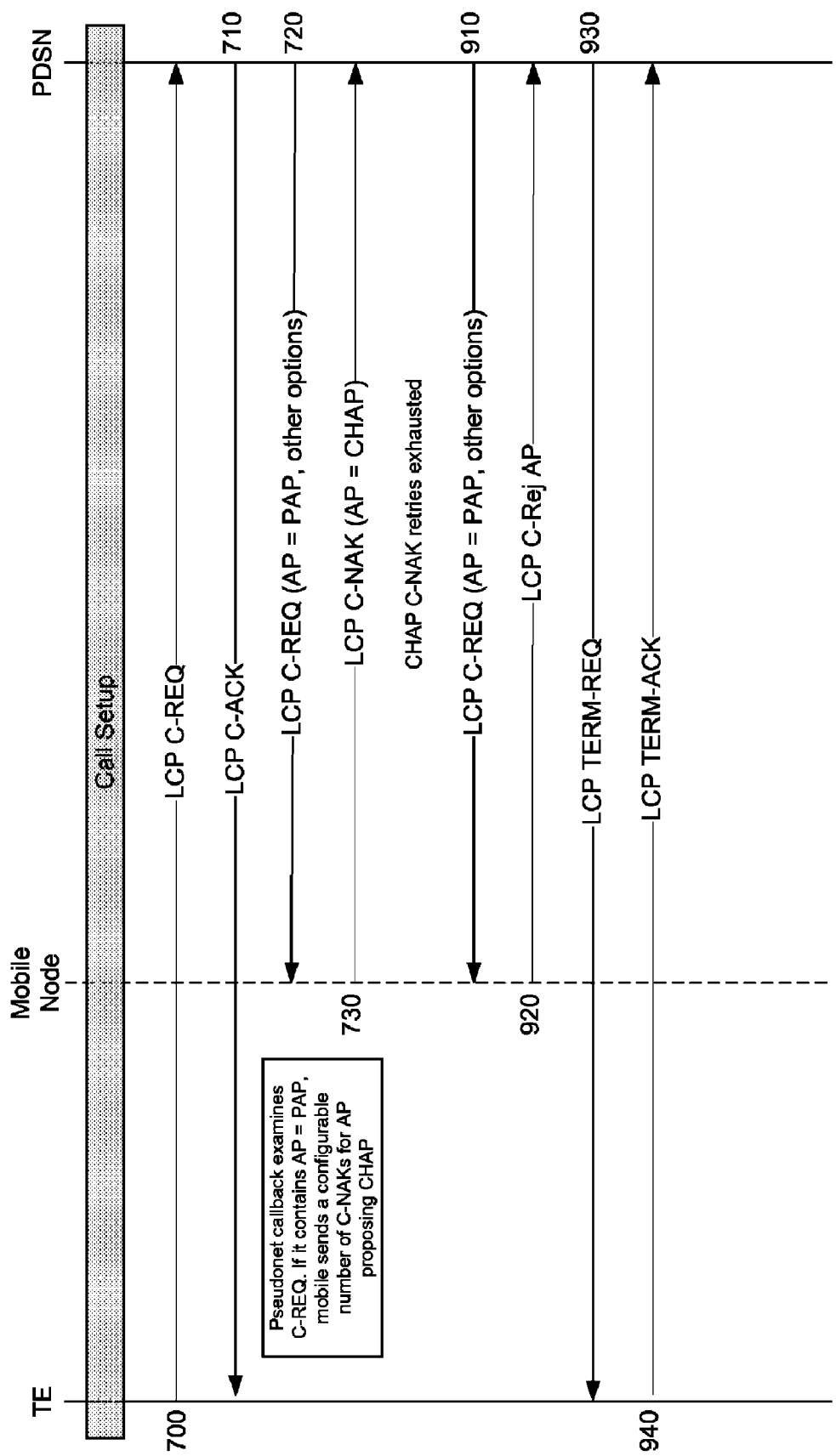
FIG. 9 is an illustration of an alternative program flow for an unsuccessful proxy encrypted authentication negotiation according to the embodiment illustrated in FIG. 6.

FIG. 9 illustrates the exchange of messages in an example LCP configuration exchange which concludes in termination of the communication attempt because no acceptable configuration could be negotiated. In this example, the messages described above with reference to FIG. 7 are exchanged until the preset number of retries has been exhausted (i.e., no C-NAK retries remain, step 620). When the next configuration request message 910 is received from the PDSN/IWF proposing an unacceptable authentication protocol, the MN responds directly to the PDSN/IWF by sending a configuration reject (C-REJ) message 920 indicating that authentication protocol is rejected. In this example, the PDSN/IWF cannot accept a configuration in which there is no authentication, and accordingly, sends a communication termination request (TERM-REQ) message 930. Since no authentication protocol is proposed in this message, the MN passes the message through to the terminal equipment which responds with a termination acknowledgment (TERM-ACK) message 940, after which the communication link will be discontinued.

Figure 10:
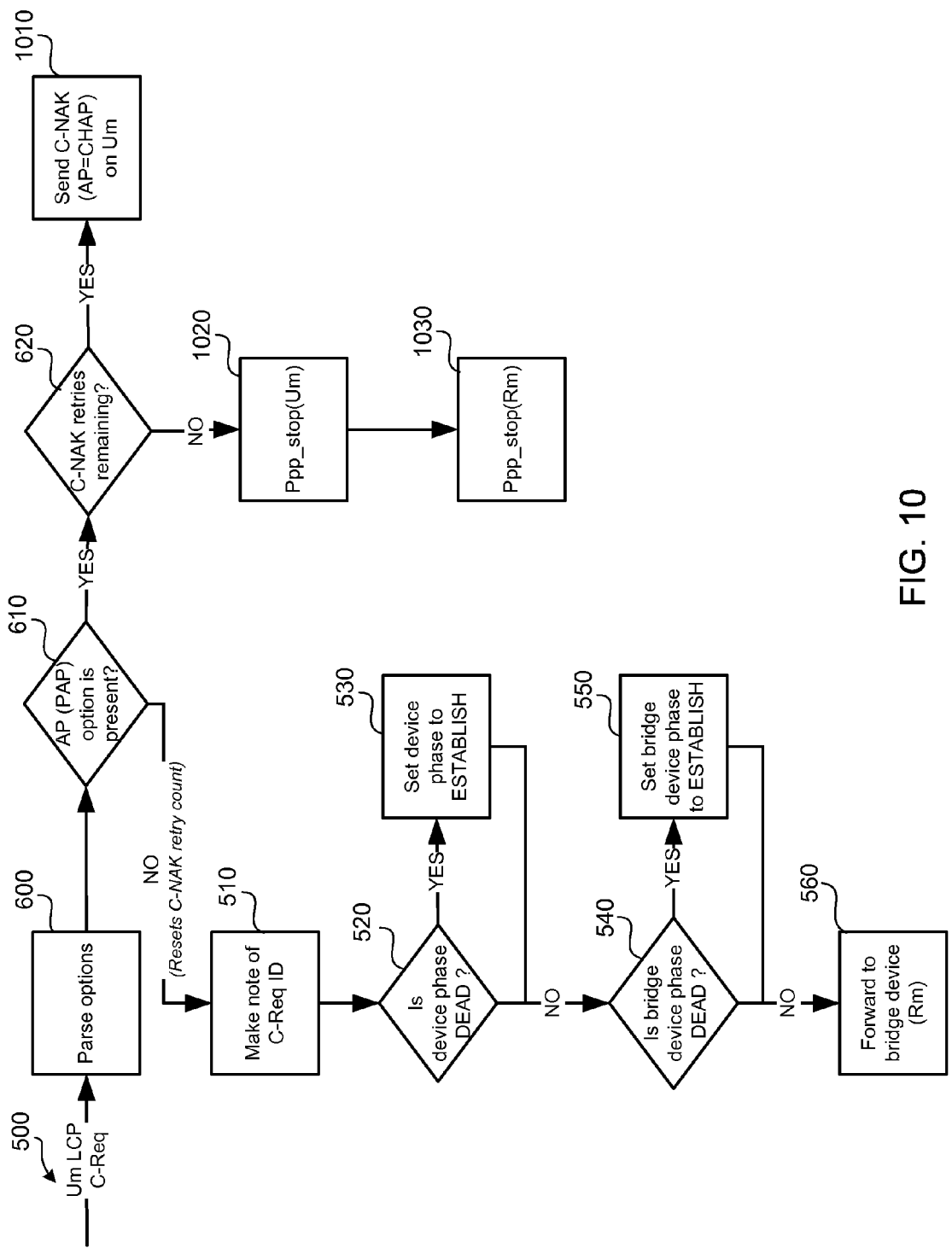
FIG. 10 is a process flow diagram for a portion of the processing of a mobile node of an alternative embodiment that enforces encrypted proxy authentication.

FIG. 10 illustrates an embodiment which promptly terminates the communication link in the event that an acceptable authentication protocol cannot be negotiated. This embodiment may be implemented where it is known that the authenticator requires authentication, in which case sending a configuration rejection message rejecting authentication protocol will be a waste of time and communication bandwidth. In this embodiment, the incoming configuration request (C-REQ) message, 500, is parsed in the MN to obtain the configuration options, including the AP value, step 600. If the AP value indicates that an acceptable authentication protocol is proposed (e.g., AP≠PAP), step 610, then the MN process described above with reference to FIG. 5 is implemented. However, if the AP value indicates that an unacceptable authentication protocol is proposed (e.g., AP=PAP), step 610, then the MN tests a counter to determine if a predetermined number of retries has been exceeded, step 620. If the number of retries has not been exceeded, the MN creates a C-NAK response message indicating that an AP value equal to CHAP is acceptable which is sent to the PDSN/IWF over the Um link, step 1010. If the number of retries has been exceeded, which indicates that the PDSN/IWF is unable to propose an acceptable authentication protocol, the MN takes a preemptive action to terminate the communication link. Specifically, the MN sends a termination request (TERM-REQ) message to the PDSN/IWF which stops the PPP connection with the network, 1020. Similarly, the MN sends a termination request (TERM-REQ) message to the terminal equipment which stops the PPP connection with the terminal equipment, 1030.

Figure 11:
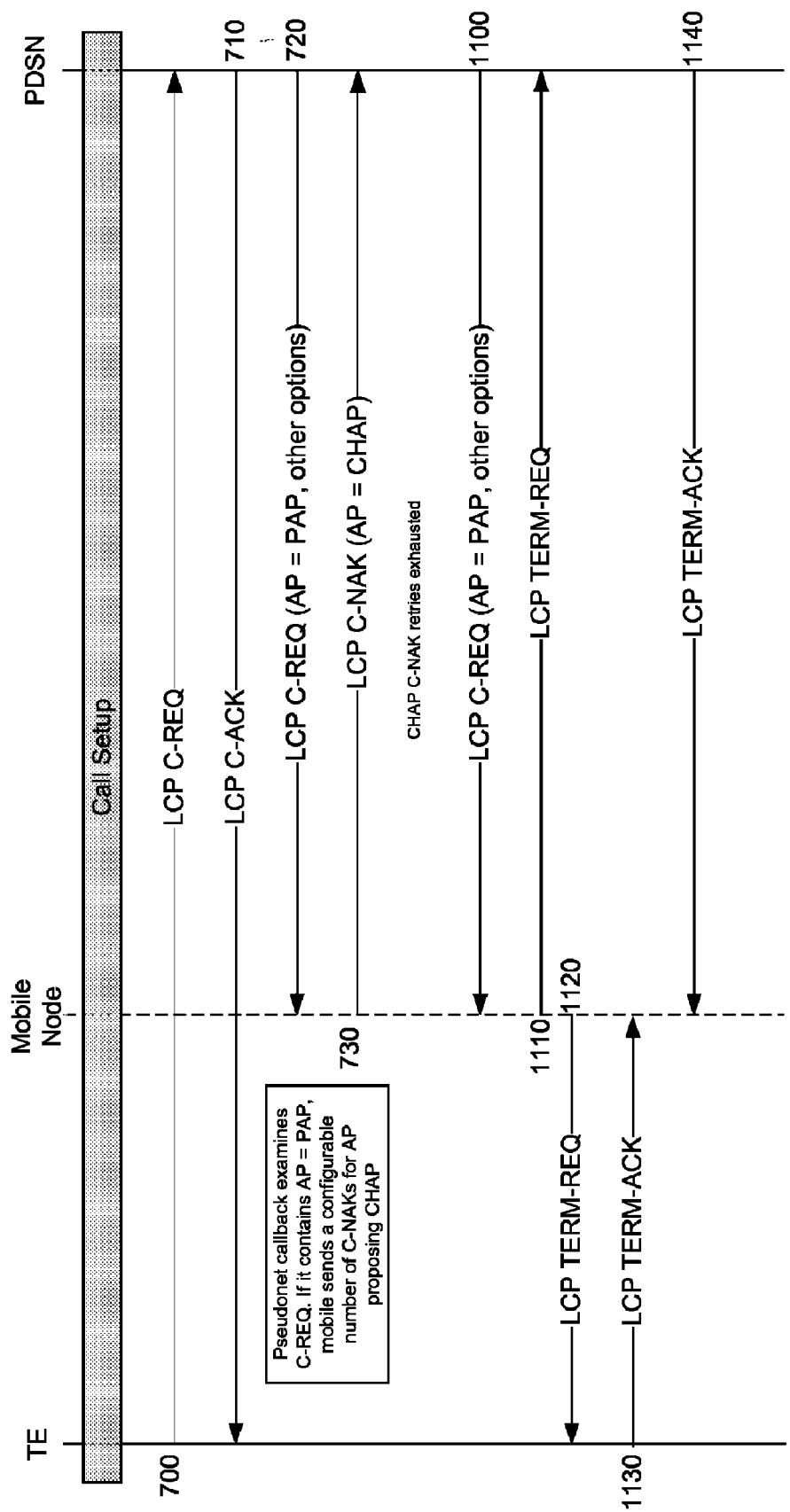
FIG. 11 is an illustration of the program flow for an unsuccessful proxy encrypted authentication negotiation according to the embodiment illustrated in FIG. 10.

The message exchanges of the embodiment illustrated in FIG. 10 are illustrated in FIG. 11 for the case where an acceptable authentication protocol cannot be negotiated. In this example, the messages described above with reference to FIG. 7 are exchanged until the preset number of retries has been exhausted (i.e., no C-NAK retries remain, step 620). When the next configuration request (C-REQ) message 1100 is received from the PDSN/IWF proposing an unacceptable authentication protocol, the MN responds directly to the PDSN/IWF by sending a termination request (TERM-REQ) message 1110, which the PDSN/IWF responds to by sending a termination acknowledgement (TERM-ACK) message 1140. Without waiting for an acknowledgement, the MN may also send a termination request (TERM-REQ) message 1120 to the terminal equipment, which will respond with a termination acknowledgement (TERM-ACK) message 1130.

Figure 12:
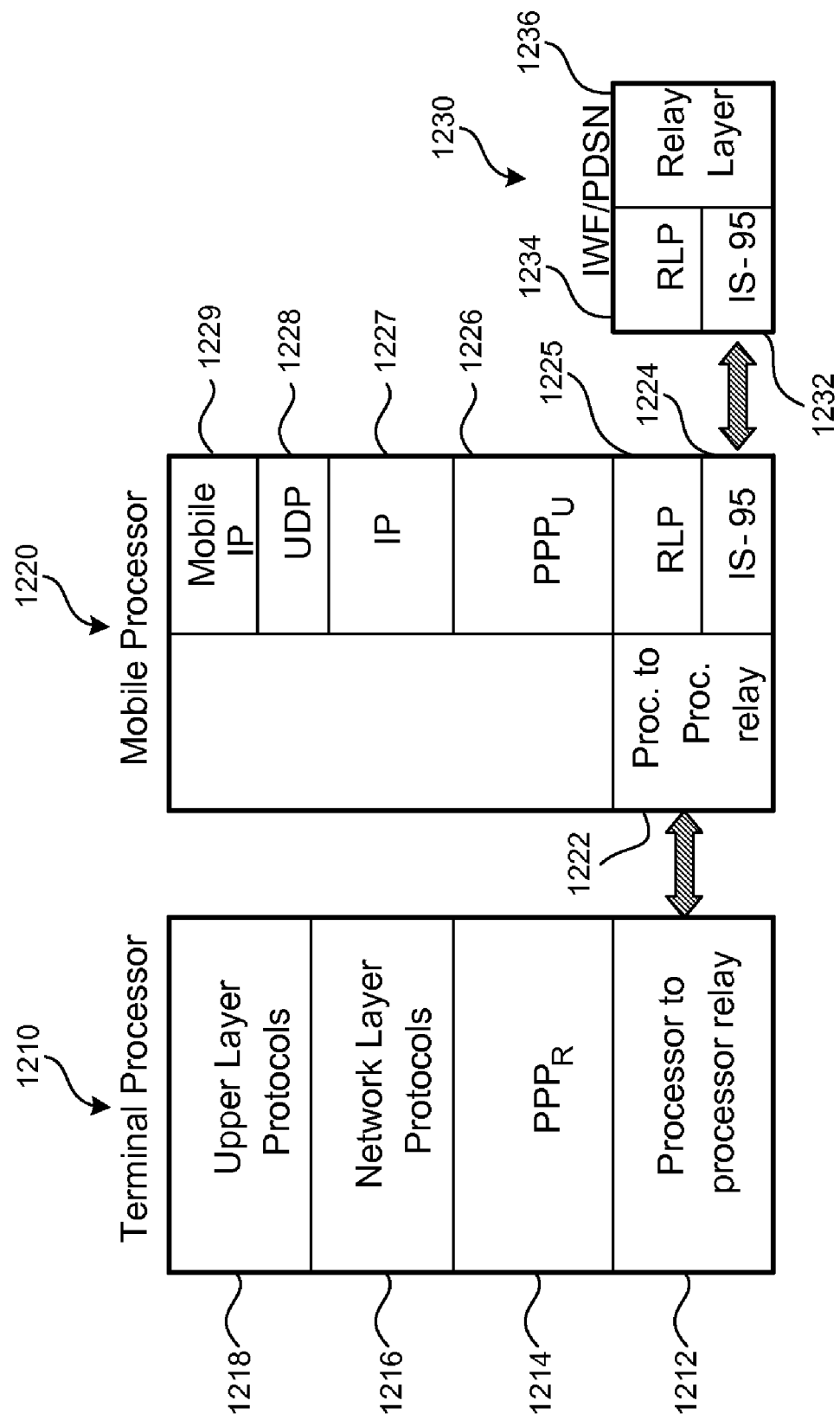
FIG. 12 is a diagram of a protocol stack of an embodiment.

While the foregoing embodiments have been described in the context of a terminal device coupled to a wireless modem connecting via a wireless data link to a network, the invention has broader applicability. For example, FIG. 12 illustrates a protocol stack of a dual mode processor configuration which can employ the foregoing embodiments. In this example, the terminal processor 1210 is coupled to a mobile processor 1220 which is configured to control communications with a PDSN/IWF via a wireless communication link. The terminal processor 1210 and mobile processor 1220 communicate by any of a number of potential electrical connection configurations and protocols, such as appropriate between two processors within a dual processor architecture. As illustrated in FIG. 12, the two processors 1210, 1220 communicate by a processor-to-processor relay layer 1212, 1222 which may be firmware (i.e., circuit connections) or a combination of firmware and software. Above this level may be the point-to-point protocol PPP layer 1214, various network layer protocols 1216, and upper layer protocols 1218 as well as application software. Within the mobile processor 1220, various communication protocols necessary to support wireless messaging Internet communication may be provided, including, for example, a mobile IP layer 1229, a user datagram protocol (UDP) layer 1228, an Internet protocol layer 1227 and a point-to-point protocol PPP layer 1226. Communication with an external wireless node 1230 can be provided through a radio link protocol (RLP) layer 1225 communicating with a IS-95 protocol layer 1224, which correspond with similar layers 1232, 1234 in the external wireless node 1230. The radio link protocol (RLP) 1225, 1234 (which is defined in IS-707.2) and IS-95 protocol 1224, 1232 are both well known in the art for use in transmitting data packets which can be encapsulated in PPP frames.

As can be seen from FIG. 12, the present invention may be applicable to any situation in which a terminal processor is coupled to modem processor which serves as an intermediary communication node and a link to another processor or network. For example, the terminal processor could be a second processor within a mobile handset (e.g., a cellular telephone) in which a first processor controls the wireless modem and passes communications to the second processor which may be dedicated to running mobile applications. In such a device, authentication credentials may be stored in the first processor, so that processor should be configured according to the present invention to ensure that no unencrypted authentication protocol is employed in wireless communications between the second processor and an external computer or network. Similarly, the methods of the present invention may be employed in a dual processor computer architecture, where one processor functions as the terminal equipment while another processor holds the authentication credentials and performs modem type functions in a pseudo-netmodel operation, thus presenting itself as a mobile node to a network. Consequently, the uses of terms such as terminal device, terminal equipment, mobile node and wireless modem to describe the various embodiments are not intended and should not be construed to limit the scope of the invention to a device tethered to a wireless modem.

The hardware used to implement the events of forgoing embodiments may be processing elements and memory elements configured to execute a set of instructions, wherein the set of instructions are for performing method steps corresponding to the above events. Alternatively, some events may be performed by circuitry that is specific to a given function. For example, the generation of a challenge response may be performed by linear feedback shift registers and adders configured to implement hashing functions or other encryption algorithms.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for enforcing encrypted proxy authentication of terminal equipment coupled to a wireless unit, comprising:
    intercepting in the wireless unit a link control protocol configuration request message directed to the terminal equipment;
    determining if an authentication protocol indicated in the link control protocol configuration request message is unacceptable to the wireless unit;
    generating in the wireless unit an appropriate response to the link control protocol configuration request message if the indicated authentication protocol is unacceptable to the wireless unit.

2. The method of claim 1, wherein determining if an authentication protocol indicated in the link control protocol configuration request message is unacceptable to the wireless unit comprises determining if the indicated authentication protocol is unencrypted authentication.

3. The method of claim 1, wherein determining if an authentication protocol value is unacceptable to the wireless unit comprises comparing the authentication protocol value to a prioritized list of acceptable authentication protocols.

4. The method of claim 1, further comprising:
maintaining a count of a number of responses generated in the wireless unit; and
checking the count prior to generating each response in the wireless unit,
wherein if the count exceeds a predetermined value, generating an appropriate response to the link control protocol configuration request message comprises generating a configuration rejection message rejecting authentication.

5. The method of claim 1, further comprising:
maintaining a count of a number of responses generated in the wireless unit; and
checking the count prior to generating each response in the wireless unit,
wherein if the count exceeds a predetermined value, generating an appropriate response to the link control protocol configuration request message comprises generating a communication termination request message.

6. The method of claim 1, wherein generating an appropriate response to the link control protocol configuration request message comprises generating a configuration not acceptable message indicating an acceptable authentication protocol.

7. The method of claim 1, wherein generating an appropriate response to the link control protocol configuration request message comprises generating a configuration not acceptable message indicating a challenge/response authentication protocol.

8. An apparatus within a wireless unit for performing a proxy encrypted authentication of terminal equipment coupled to the wireless unit, comprising:
at least one memory element; and
at least one processing element configured to execute a set of instructions stored upon the at least one memory element, the set of instructions for:
intercepting in the wireless unit a link control protocol configuration request message directed to the terminal equipment;
determining if an authentication protocol indicated in the link control protocol configuration request message is unacceptable to the wireless unit;
generating in the wireless unit an appropriate response to the link control protocol configuration request message if the indicated authentication protocol is unacceptable to the wireless unit.

9. The apparatus of claim 8, wherein the at least one processing element is further configured to execute instructions stored upon the at least one memory element for determining if the indicated authentication protocol is unencrypted authentication.

10. The apparatus of claim 8, wherein the at least one processing element is further configured to execute instructions stored upon the at least one memory element for comparing the authentication protocol value to a prioritized list of acceptable authentication protocols.

11. The apparatus of claim 8, wherein the at least one processing element is further configured to execute instructions stored upon the at least one memory element for:
maintaining a count of a number of responses generated in the wireless unit;
checking the count prior to generating each response in the wireless unit; and
if the count exceeds a predetermined value, generating a configuration rejection message rejecting authentication.

12. The apparatus of claim 8, wherein the at least one processing element is further configured to execute instructions stored upon the at least one memory element for:
maintaining a count of a number of responses generated in the wireless unit;
checking the count prior to generating each response in the wireless unit; and
if the count exceeds a predetermined value, generating a communication termination request message.

13. The apparatus of claim 8, wherein the at least one processing element is further configured to execute instructions stored upon the at least one memory element for generating a configuration not acceptable message indicating an acceptable authentication protocol as the appropriate response to the link control protocol configuration request message.

14. The apparatus of claim 8, wherein the at least one processing element is further configured to execute instructions stored upon the at least one memory element for generating a configuration not acceptable message indicating a challenge/response authentication protocol as the appropriate response to the link control protocol configuration request message.

15. Apparatus for performing a proxy authentication of terminal equipment coupled to a wireless unit, comprising:
means for intercepting in the wireless unit a link control protocol configuration request message directed to the terminal equipment;
means for determining if an authentication protocol indicated in the link control protocol configuration request message is unacceptable to the wireless unit;
means for generating in the wireless unit an appropriate response to the link control protocol configuration request message if the indicated authentication protocol is unacceptable to the wireless unit.

16. The apparatus of claim 15, wherein the means for determining if an authentication protocol indicated in the link control protocol configuration request message is unacceptable to the wireless unit comprises means for determining if the indicated authentication protocol is unencrypted authentication.

17. The apparatus of claim 15, wherein the means for determining if an authentication protocol value is unacceptable to the wireless unit comprises means for comparing the authentication protocol value to a prioritized list of acceptable authentication protocols.

18. The apparatus of claim 15, further comprising:
means for maintaining a count of a number of responses generated in the wireless unit; and
means for checking the count prior to generating each response in the wireless unit,
wherein if the count exceeds a predetermined value, the means for generating an appropriate response to the link control protocol configuration request message generates a configuration rejection message rejecting authentication.

19. The apparatus of claim 15, further comprising:
means for maintaining a count of a number of responses generated in the wireless unit; and
means for checking the count prior to generating each response in the wireless unit,
wherein if the count exceeds a predetermined value, the means for generating an appropriate response to the link control protocol configuration request message generates a communication termination request message.

20. The apparatus of claim 15, wherein the means for generating an appropriate response to the link control protocol configuration request message comprises means for generating a configuration not acceptable message indicating an acceptable authentication protocol.

21. The apparatus of claim 15, wherein the means for generating an appropriate response to the link control protocol configuration request message comprises means for generating a configuration not acceptable message indicating a challenge/response authentication protocol.

22. A processor readable memory unit having stored thereon processor executable instructions configured to cause a processor to perform steps comprising:
    intercepting in the wireless unit a link control protocol configuration request message directed to the terminal equipment;
    determining if an authentication protocol indicated in the link control protocol configuration request message is unacceptable to the wireless unit;
    generating in the wireless unit an appropriate response to the link control protocol configuration request message if the indicated authentication protocol is unacceptable to the wireless unit.

23. The processor readable memory of claim 22, wherein determining if an authentication protocol indicated in the link control protocol configuration request message is unacceptable to the wireless unit comprises determining if the indicated authentication protocol is unencrypted authentication.

24. The processor readable memory of claim 22, wherein determining if an authentication protocol value is unacceptable to the wireless unit comprises comparing the authentication protocol value to a prioritized list of acceptable authentication protocols.

25. The processor readable memory of claim 22, wherein the stored processor executable instructions are further configured to cause a processor to perform steps comprising:
    maintaining a count of a number of responses generated in the wireless unit; and
    checking the count prior to generating each response in the wireless unit,
    wherein if the count exceeds a predetermined value, generating an appropriate response to the link control protocol configuration request message comprises generating a configuration rejection message rejecting authentication.

26. The processor readable memory of claim 22, wherein the stored processor executable instructions are further configured to cause a processor to perform steps comprising:
    maintaining a count of a number of responses generated in the wireless unit; and
    checking the count prior to generating each response in the wireless unit,
    wherein if the count exceeds a predetermined value, generating an appropriate response to the link control protocol configuration request message comprises generating a communication termination request message.

27. The processor readable memory of claim 22, wherein generating an appropriate response to the link control protocol configuration request message comprises generating a configuration not acceptable message indicating an acceptable authentication protocol.

28. The processor readable memory of claim 22, wherein generating an appropriate response to the link control protocol configuration request message comprises generating a configuration not acceptable message indicating a challenge/response authentication protocol.

29. A method for negotiating encrypted proxy authentication of terminal equipment coupled to a wireless unit, comprising:
    intercepting in the wireless unit a link control protocol message directed to the terminal equipment;
    determining if an authentication protocol value in the link control protocol message indicates an authentication protocol that is unacceptable to the wireless unit;
    generating in the wireless unit an appropriate response to the link control protocol message;
    forwarding a challenge message to the terminal equipment; and
    ignoring a challenge response received from the terminal equipment.

30. The method of claim 29, wherein generating the appropriate response to the link control protocol message comprises generating a configuration not acceptable response message indicating an acceptable authentication protocol.

31. The method of claim 29, wherein if the link control protocol message is a configuration request message and the authentication protocol value in the configuration request indicates authentication without encryption, generating the appropriate response to the link control protocol message comprises generating a configuration not acceptable response message indicating one of (a) an encrypted authentication protocol or (b) no authentication.

32. The method of claim 30, further comprising:
    maintaining a count of a number of configuration not acceptable response generated;
    checking the count prior to generating each configuration not acceptable response; and
    generating a configuration rejection message rejecting authentication in the event the count exceeds a predetermined value.

33. The method of claim 30, further comprising:
    maintaining a count of a number of configuration not acceptable response generated;
    checking the count prior to generating each configuration not acceptable response; and
    generating a communication termination request in the event the count exceeds a predetermined value.

34. A method for performing a proxy encrypted authentication of a device tethered to a wireless unit, comprising:
    intercepting a link control protocol configuration request directed to the tethered device;
    determining if an authentication protocol value in the configuration request is acceptable;
    generating an appropriate response to the link control protocol configuration request without forwarding the link control protocol configuration request to the tethered device;
    intercepting a challenge directed to the tethered device;
    generating an appropriate response to the challenge without waiting for input from the tethered device;
    forwarding the challenge to the tethered device; and
    ignoring a challenge response received from the tethered device.

35. The method of claim 34, wherein generating the appropriate response to the challenge comprises using password information associated with the wireless unit to generate the appropriate response rather than using password information associated with the tethered device.

36. The method of claim 34, wherein the authentication is a challenge/response authentication procedure.

37. The method of claim 36, wherein the challenge/response authentication procedure is the Challenge Handshake Authentication Protocol.

38. An apparatus within a wireless unit for performing a proxy encrypted authentication of a device tethered to the wireless unit, comprising:
at least one memory element; and
at least one processing element configured to execute a set of instructions stored upon the at least one memory element, the set of instructions for:
intercepting a link control protocol configuration request directed to the tethered device;
determining if an authentication protocol value in the configuration request is acceptable;
generating an appropriate response to the link control protocol configuration request without forwarding the link control protocol configuration request to the tethered device;
intercepting a challenge directed to the tethered device;
generating an appropriate response to the challenge without waiting for input from the tethered device;
forwarding the challenge to the tethered device; and
ignoring a challenge response received from the tethered device.

39. Apparatus for performing a proxy authentication of a device tethered to a wireless unit, comprising:
means for intercepting a link control protocol configuration request directed to the tethered device;
means for determining if an authentication protocol value in the configuration request is acceptable;
means for generating an appropriate response to the link control protocol configuration request without forwarding the link control protocol configuration request to the tethered device;
means for intercepting a challenge directed to the tethered device;
means for generating an appropriate response to the challenge without waiting for input from the tethered device;
means for forwarding the challenge to the tethered device; and
means for determining to ignore a challenge response received from the tethered device.

* * * * *

UNITED STATES PATENT AND TRADEMARK OFFICE
CERTIFICATE OF CORRECTION

PATENT NO. : 7,877,081 B2
APPLICATION NO. : 11/772820
DATED : January 25, 2011
INVENTOR(S) : Sharma et al.

It is certified that error appears in the above-identified patent and that said Letters Patent is hereby corrected as shown below:

Title page, item (75), inventor Name: "Marcello Lloy" to read as -- Marcello Lioy --

Signed and Sealed this
Twenty-fifth Day of June, 2013

Teresa Stanek Rea
*Acting Director of the United States Patent and Trademark Office*